(12) United States Patent
Siddiqui

(10) Patent No.: US 12,373,776 B2
(45) Date of Patent: *Jul. 29, 2025

(54) SYSTEMS AND METHODS FOR AUTONOMOUS INVENTORY COUNTING AND TRACKING

(71) Applicant: Hashim Muhammad Siddiqui, Schaumburg, IL (US)

(72) Inventor: Hashim Muhammad Siddiqui, Schaumburg, IL (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/948,014

(22) Filed: Sep. 19, 2022

(65) Prior Publication Data
US 2023/0081703 A1    Mar. 16, 2023

Related U.S. Application Data

(63) Continuation of application No. 16/355,432, filed on Mar. 15, 2019, now Pat. No. 11,449,826.

(51) Int. Cl.
*G06Q 10/087* (2023.01)
*G07F 11/04* (2006.01)

(52) U.S. Cl.
CPC ......... *G06Q 10/087* (2013.01); *G07F 11/045* (2013.01)

(58) Field of Classification Search
CPC . G06Q 10/087; A47F 2001/103; A47F 1/085; A47F 1/08; A47F 1/04; A47F 1/03; A47F 1/087; A47F 1/12; A47F 1/06; A47F 1/065; A47F 1/035; A47F 7/28; A47F 9/042; A47F 10/06; A47F 2009/044; A47F 3/02; A47F 3/0434; A47F 7/285; A47F 10/02; A47F 3/002; A47F 5/112;
(Continued)

(56) References Cited

U.S. PATENT DOCUMENTS

| 5,190,186 A | 3/1993 | Yablans et al. |
| 5,649,363 A * | 7/1997 | Rankin, VI ........... B21C 51/005 |
| | | 29/896.9 |
| 5,730,320 A | 3/1998 | David |

(Continued)

FOREIGN PATENT DOCUMENTS

WO    WO-2011127950 A1 *  10/2011   .............. G07F 11/14

OTHER PUBLICATIONS

Non-Final Office Action on U.S. Appl. No. 16/355,432 dtd Dec. 7, 2021 (23 pages).

(Continued)

*Primary Examiner* — Florian M Zeender
*Assistant Examiner* — Vanessa Deligi
(74) *Attorney, Agent, or Firm* — Foley & Lardner LLP

(57) ABSTRACT

A method of tracking inventory comprises providing a dispenser. The dispenser includes a body laterally extending between a first end and a second end. The dispenser also includes a stopper slidably coupled to the body to move between the first end and the second end and a biasing member coupled to the stopper to bias the stopper towards the second end. A plurality of identifiers are displayed on the biasing member. The method includes securing a plurality of units within the dispenser between the stopper and the second end, and displaying at least one of the plurality of identifiers to a user of the dispenser, the at least one of the plurality of identifiers corresponding to a total number of units in the dispenser.

19 Claims, 13 Drawing Sheets

(58) Field of Classification Search
CPC .. A47F 3/04; A47F 3/0486; A47F 5/00; A47F 5/0861; A47F 13/085; A47F 1/10–1/128
See application file for complete search history.

(56) References Cited

U.S. PATENT DOCUMENTS

| | | | | |
|---|---|---|---|---|
| 6,105,791 | A * | 8/2000 | Chalson | A47F 1/126 |
| | | | | 211/59.3 |
| 6,582,037 | B1 | 6/2003 | Rudick et al. | |
| 10,238,142 | B1 * | 3/2019 | Haddad | A24F 15/005 |
| 2005/0168345 | A1 | 8/2005 | Swafford et al. | |
| 2009/0008246 | A1 | 1/2009 | Reynolds et al. | |
| 2011/0055103 | A1 * | 3/2011 | Swafford, Jr. | G06Q 10/087 |
| | | | | 705/345 |
| 2013/0175291 | A1 | 7/2013 | Wegelin et al. | |
| 2013/0280507 | A1 | 10/2013 | Kondo | |
| 2013/0289819 | A1 | 10/2013 | Hassib et al. | |
| 2017/0202369 | A1 * | 7/2017 | Mercier | A47F 5/083 |
| 2018/0225625 | A1 * | 8/2018 | DiFatta | G06Q 10/087 |
| 2019/0002175 | A1 * | 1/2019 | Kalinowski | B65D 77/0446 |
| 2019/0164098 | A1 * | 5/2019 | Setchell | G06Q 10/06311 |
| 2020/0043272 | A1 | 2/2020 | Vazquez et al. | |
| 2020/0043273 | A1 | 2/2020 | Vazquez et al. | |
| 2020/0051004 | A1 | 2/2020 | Aji | |
| 2021/0026157 | A1 * | 1/2021 | Muramatsu | G02C 5/06 |
| 2021/0157853 | A1 * | 5/2021 | Yamin | G06F 16/9035 |
| 2023/0210277 | A1 * | 7/2023 | Ewing | G06K 7/1417 |
| | | | | 705/28 |

OTHER PUBLICATIONS

Notice of Allowance on U.S. Appl. No. 16/355,432 dtd May 12, 2022 (13 pages).

* cited by examiner

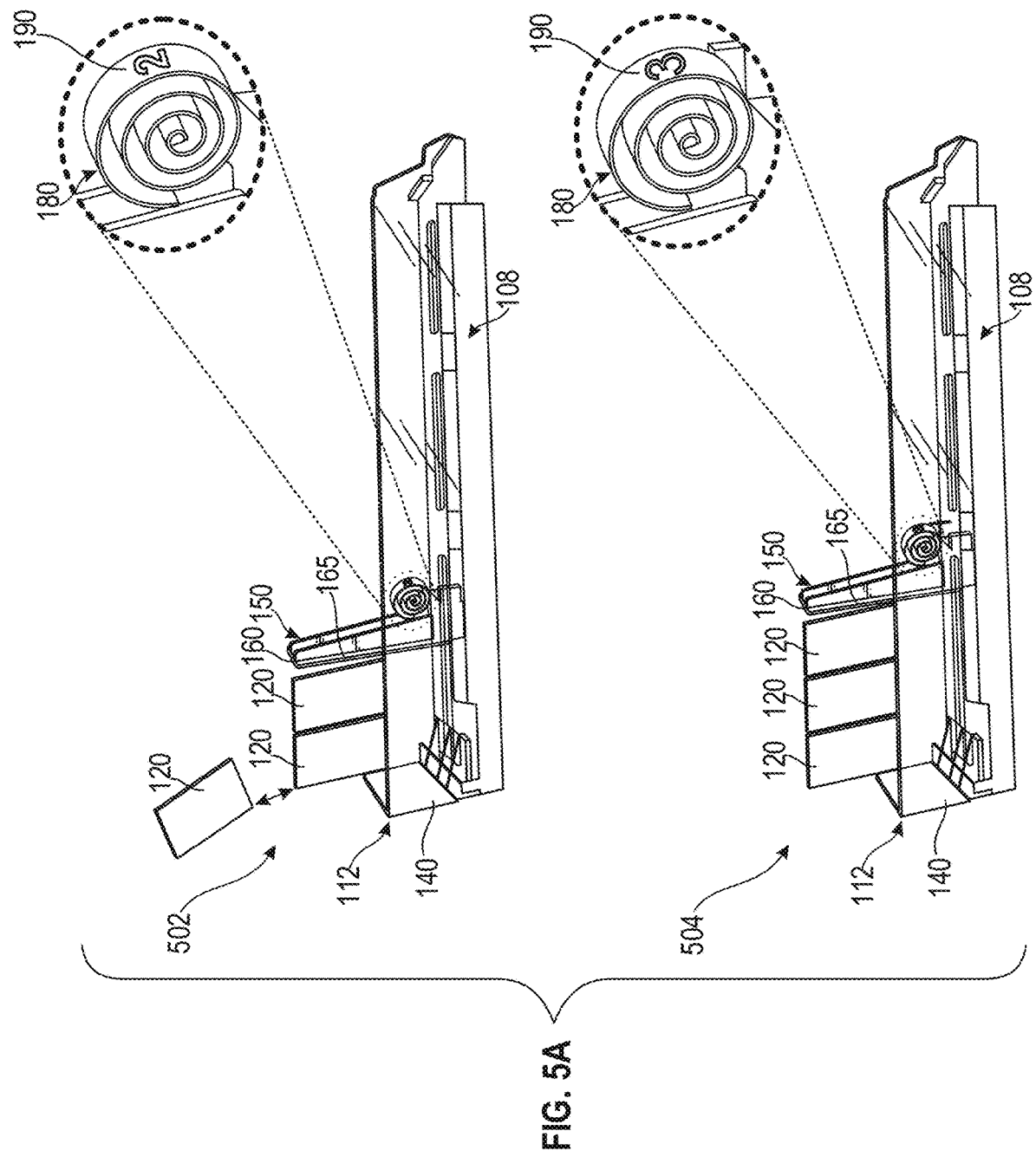

SYSTEMS AND METHODS FOR AUTONOMOUS INVENTORY COUNTING AND TRACKING

CROSS-REFERENCE TO RELATED PATENT APPLICATIONS

This application is a continuation of U.S. patent application Ser. No. 16/355,432, filed Mar. 15, 2019, the entire disclosure of which is incorporated by reference herein.

TECHNICAL FIELD

The present application relates generally to the field of taking inventory of consumer goods. More specifically, the present application relates to systems and methods for counting and taking inventory autonomously.

BACKGROUND

Convenience store shelves must be adequately and timely stocked to ensure sales opportunities are not missed. Adequately and timely stocking the store shelves can be challenging for retailers if they are unsure about their inventory or if their inventory cannot keep up with demand. Products in high consumer demand can be difficult to keep adequately and timely stocked because these products can sell out quickly. Additionally, products with seasonal demand fluctuations can be difficult to adequately and timely stock because inventory needs to adjust to the demand to prevent selling out during high demand times or overstocking during low demand times. Moreover, even adequately and timely stocking store shelves can be challenging because inventory is traditionally taken by hand. Taking inventory by hand is not always reliable, and smaller retailers (e.g., gas stations, drug stores, etc.) may have too few employees, too much variety in products, and/or budget restrictions that prevent them from adopting the traditional Kanban practices utilized by larger manufacturing firms. But keeping shelves stocked in a timely manner can maximize revenue for these smaller retailers and satisfy their customers' expectations.

SUMMARY

Various example embodiments relate to a method of tracking inventory. The method of tracking inventory includes storing at least one container unit within an autonomous inventory counting and tracking (AICT) system. The AICT system includes a dispenser. The dispenser includes a body, a first ledge, defining a first end of the body, a second ledge defining a second end of the body, the second ledge spaced laterally away from the first ledge, and a track. The track is positioned between the first ledge and the second ledge. A container unit is secured within the AICT system using a stopper. The stopper includes a first face configured to interface with the container unit and the stopper includes a second face opposite the first face, wherein the stopper moves translationally toward the first ledge in response to the container unit being added to the dispenser, and wherein the stopper moves translationally toward the second ledge in response to the container unit being removed from the dispenser. A single container unit distance is identified, wherein the single container unit distance is a change in distance between the first face and the second ledge when a single container unit is removed from the dispenser. A total container unit distance is identified, wherein the total container unit distance is the distance between the first face and the second ledge. An inventory count is determined using the total container unit distance and the single container unit distance, the inventory count representative of the container units in the AICT system. The inventory count is displayed to a person taking inventory.

In an alternative embodiment, the inventory counting and tracking system comprises a dispenser configured to store at least one container unit, wherein the dispenser has a first ledge and a second ledge positioned on opposite ends of the dispenser. An arm is coupled to the dispenser, such that the arm moves towards the first ledge in response to a container unit being added to the dispenser, and wherein the arm moves towards the second ledge in response to a container unit being removed from the dispenser. A single container unit distance is defined by the distance that the arm moves when a single container unit is added to the dispenser. A biasing mechanism is operably coupled to the arm and biases the arm towards the second ledge. A sensor is coupled to the arm such that the sensor is configured to determine the distance between the second ledge and the arm. A processor is configured to determine the number of container units in the dispenser using the total container unit distance and the single container unit distance, and a display device operably coupled to the processor, wherein the display device is configured to notify a user the number of container units in the dispenser.

In an alternative embodiment, the inventory counting and tracking system comprises a dispenser configured to store at least one container unit, wherein the dispenser has a first ledge and a second ledge positioned on opposite ends of the dispenser. An arm is coupled to the dispenser, such that the arm moves towards the first ledge in response to a container unit being added to the dispenser, and wherein the arm moves towards the second ledge in response to a container unit being removed from the dispenser. A single container unit distance is defined by the distance that the arm moves when a single container unit is added to the dispenser. A biasing mechanism is operably coupled to the arm and biases the arm towards the second ledge. A sensor is coupled to the first ledge such that the sensor is configured to determine the distance between the arm and the first ledge. A processor is configured to determine the number of container units in the dispenser using the total container unit distance and the single container unit distance, and a display device operably coupled to the processor, wherein the display device is configured to notify a user the number of container units in the dispenser.

In another embodiment, an autonomous inventory counting and tracking system is described. The system includes a dispenser configured to accept a container unit. The dispenser includes a body, a first ledge defining a first end of the body, a second ledge defining a second end of the body, the second ledge spaced laterally away from the first ledge, a track positioned between the first ledge and the second ledge and extending the length of the body, and a stopper slidably coupled to the track. The stopper includes a first face and the stopper comprising a second face opposite the first face. The stopper is configured to move translationally toward the first ledge in response to the container unit being added to the dispenser. The stopper is configured to move toward the second ledge in response to the container unit being removed from the dispenser. A single container unit distance is defined by the distance that the stopper moves when the container unit is added to the dispenser. A biasing member is operably coupled to the stopper that biases the stopper toward the second ledge, the biasing member comprising. A rolled coil of metal includes a first coil end coupled to the second ledge and a second coil end coupled to the stopper. An identifier is coupled to the rolled coil of metal, the identifier corresponding to the inventory count. A distance sensor is coupled to a second face of the stopper. The distance sensor is configured to measure the distance between the second ledge and the second face. A controller is configured to determine an inventory count using a total container unit distance and the single container unit distance. A display is configured to display the inventory count. The controller is configured to control the distance sensor and control the display and the inventory count corresponds to the container units remaining in the AICT system.

In yet another embodiment, an inventory counting and tracking (AICT) system is described. A dispenser is configured to accept a container unit. The dispenser includes a body, a first ledge defining a first end of the body, a second ledge defining a second end of the body, the second ledge spaced laterally away from the first ledge, a track, the track positioned between the first ledge and the second ledge and extending the length of the body, and a stopper slidably coupled to the track. The stopper is configured to move translationally toward the first ledge in response to the container unit being added to the dispenser. The stopper is configured to move toward the second ledge in response to the container unit being removed from the dispenser. A single container unit distance is defined by the distance that the stopper moves when the container unit is added to the dispenser. A biasing member is operably coupled to the stopper that biases the stopper toward the second ledge. An identifier is visible to a person taking inventory and corresponding to the container units in the AICT system.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 5A shows multiple side view of a portion of the autonomous inventory counting and tracking system of FIG. 4.

DETAILED DESCRIPTION

Figure 1:
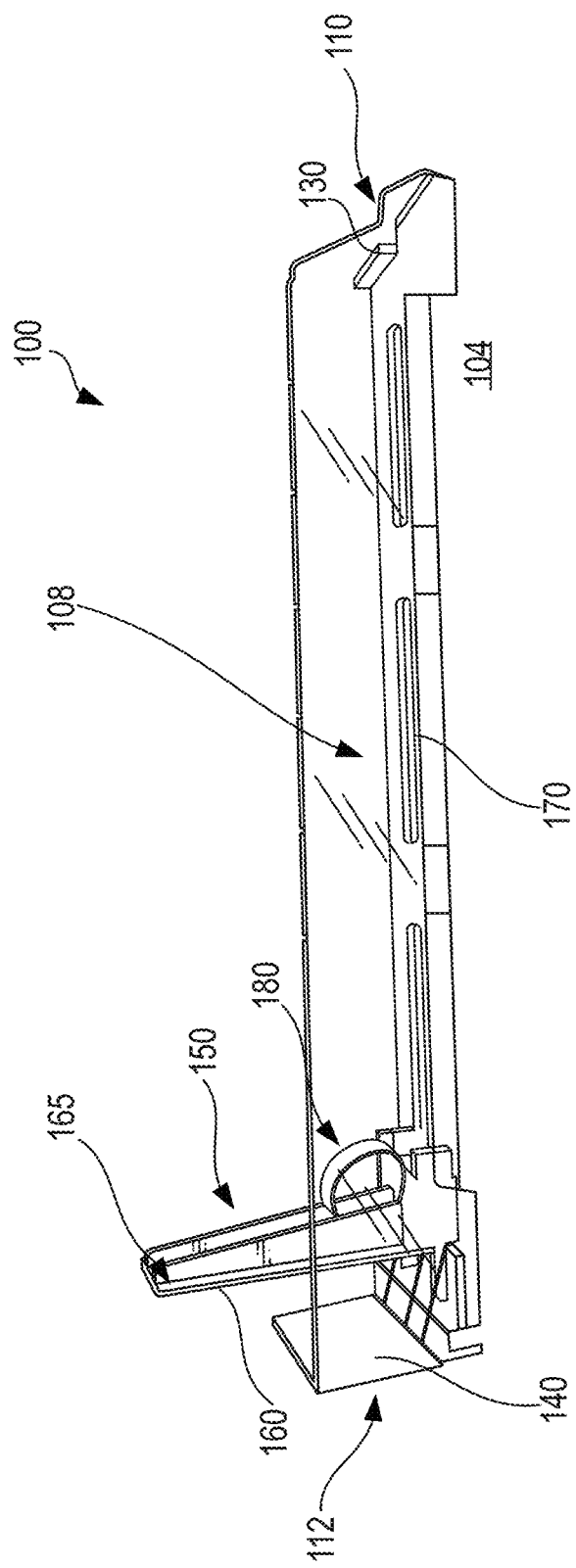
FIG. 1 shows a side view of a dispenser, according to an example embodiment.

In order to track inventory, many consumer items in a convenience store are counted by hand and recorded in some sort of hand-written log. For example, convenience store employees are usually instructed to count all packs of cigarettes for each brand of cigarette at least once during each shift. In large convenience stores, this means convenience store employees may have to count over three-thousand packs of cigarettes each time inventory is taken. Cigarettes are typically stored in rows in individual cigarette dispensers behind the check-out counter. To speed up the process of taking inventory, employees number the top of each box in a row so that cigarettes can be counted in rows instead of being counted by the individual box. However, labeling each pack of cigarettes can be time consuming and unreliable. Over time, the packs may become disorganized and out of numerical order, possibly leading to inventory tracking errors. For this reason, there is a market need for a product that can increase the efficiency and accuracy of inventory tracking.

In addition to reducing inventory tracking errors, it is important to monitor the products to determine if they are being stolen. A potential problem in convenience stores is the theft of items from both the product shelves and from behind the counter. Without actively tracking inventory, it can be difficult to determine what products (if any) were stolen and when it was stolen. Currently, monitoring theft would require someone to review the entire shift of an employee when a product discrepancy occurs. Reviewing security camera footage is a time consuming process and may require hours of reviewing footage to determine if and when a single item was stolen. Convenience store owners may attempt to minimize the number of cigarette packs that employees steal by instructing the employees to regularly take inventory of the cigarettes. However, when taking inventory, employees can steal cigarettes and then intentionally record an incorrect number of cigarettes in their inventory log to give the appearance that no cigarettes were stolen during the employees' work shift. For this reason, there is a market need for a device that automatically, continuously, and actively tracks cigarette inventory and other products.

Referring to the figures generally, a system for and a method of tracking inventory is described. The method includes storing a plurality of container units (e.g., cigarette packs, product container, etc.) in an autonomous inventory counting and tracking (AICT) system and securing the container units in the AICT system a biasing mechanism or similar element. In some embodiments, the biasing mechanism is a constant force spring coupled to a stopper. The AICT system identifies the total length occupied by the container units in the AICT system and uses previously determined information regarding a single container unit (e.g., the thickness of the container unit), to determine inventory data. The inventory data provides a user (e.g., employee or manager) information related to the total number of container units stored within the AICT system. In short, the AICT system uses distance measurements to determine how many container units are stored in the AICT system. The inventory data can be used by the AICT system to increase efficiency and accuracy of the inventory system. For example, the inventory data can be communicated (e.g., displayed, transmitted, printed, etc.) to an employee taking inventory or it can be uploaded to an online database that can be accessed by store owners and/or store suppliers.

As used herein, the term "container unit" refers to a singular consumer good. For example, a container unit could refer to, but is not limited to, a pack of cigarettes, a can of chewing tobacco, a box of breath mints, a pack of gum, a bottled beverage, a box or bottle of over the counter drugs, a tube of toothpaste, a pack of toilet paper, a roll of paper towel, a bag of coffee, a case of beer, a bottle of liquor, a bag of chips, a granola or protein bar, a carton of milk, a can of food, a box of personal hygiene or grooming products, a bag of pet food, a package of frozen food, a stick of deodorant, and other items sold at a convenience store having a set or standard size. While the present application may refer to embodiments that are used for tracking the inventory of cigarettes, it will be appreciated that this is an example embodiment and that the method and systems described herein can be modified to accommodate a wide variety of consumer goods including the tracking of an inventory of goods in a vending machine.

As used herein, the term "inventory data" refers generally to information about one or more container units. Inventory data includes the total number of container units in the AICT system at a given time (e.g., date, day, month, year, etc.). In some embodiments, inventory data includes a time stamp that connects the removal of a container unit from an AICT system with a time; information about the container unit, including the price, age, weight, brand, flavor, and any other defining characteristic of the container unit; a location of the product within the store or on the shelf; information such as the time a product was placed in the AICT system; and other container unit information.

As used herein, the term "the inventory count" refers generally to the total number of container units in the AICT system at a given time. The inventory count may be represented as an integer. In some embodiments, the inventory count may not be represented by an integer. As will be appreciated, the inventory count is a type of inventory data. The inventory count may be collected by the AICT system. In some embodiments, the inventory count is captured by an employee taking inventory.

As used herein, the term "taking inventory" refers to the action of collecting the inventory data, including the inventory count. Taking inventory may be carried out by a person, such as an employee or a convenience store owner. Taking inventory may be carried out by the AICT system. For example, taking inventory may be carried out by a microprocessor, computer board/computer unit, or a sensor of the AICT system.

The ability to actively track inventory is advantageous for several reasons. By actively tracking inventory and uploading inventory data to an online database, it is much easier for convenience store owners to determine when theft of the container unit occurs because the exact time that each container unit is removed from the AICT system can be recorded. This prevents convenience store owners from having to review hours of security camera footage and gives them the ability to pinpoint the time when a stolen item was removed from the AICT system. Additionally, the AICT system makes it possible for inventory to be tracked remotely. This allows convenience store employees to spend less time taking inventory and spend more time improving the customers' shopping experience. Tracking inventory using the AICT system also makes it possible for convenience store owners that own multiple stores to track the inventory in all their stores from one location. Store owners are further able to determine buying trends and adjust inventory based on those trends. For example, if cigarette sales are typically higher during times of good weather, a convenience store owner will be better equipped to stock the store with the proper number of cigarettes based on the collected inventory data. This also gives convenience stores the ability to automatically order more container units once the number of container units in store drops below a certain threshold. For example, every time there are less than fifty packs of cigarettes, the AICT system can automatically send an order to a supplier for more cigarettes. For all of these reasons, it is advantageous to actively track inventory.

Figure 2:
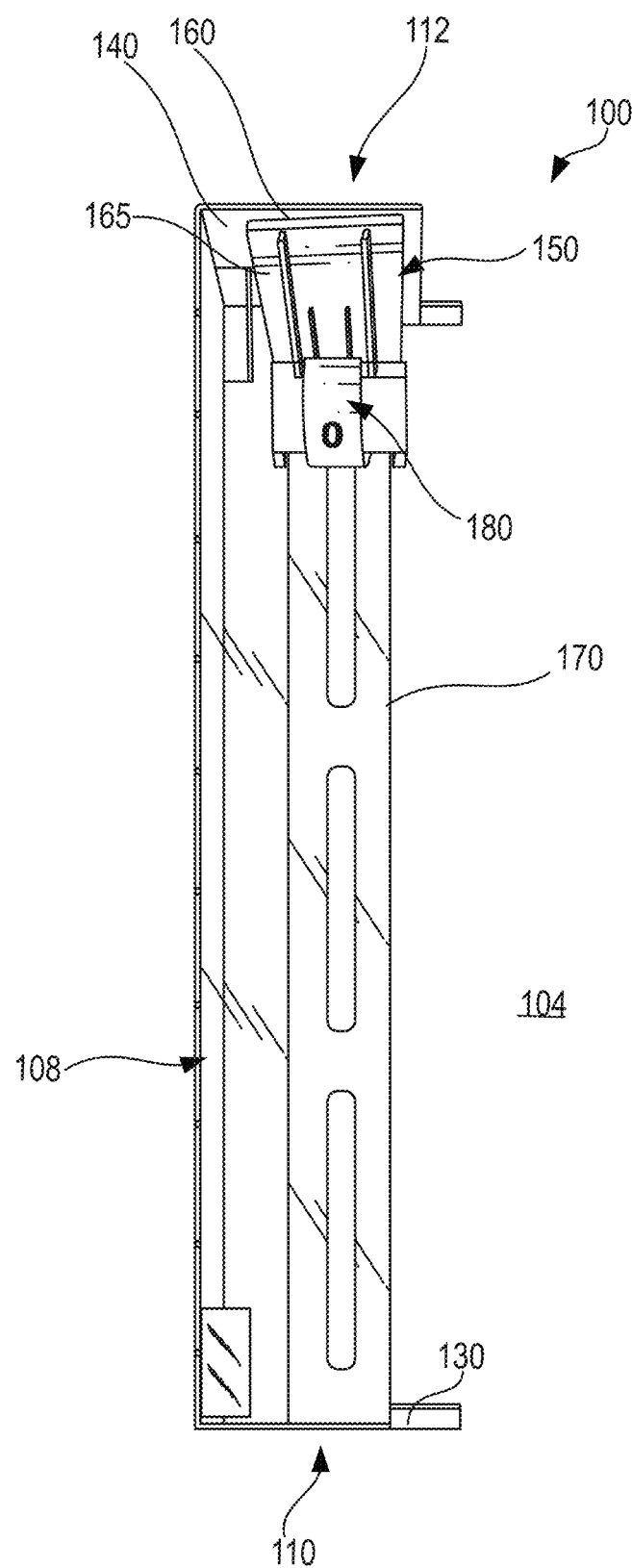
FIG. 2 shows a top view of the dispenser of FIG. 1.

Referring to FIGS. 1-2, a dispenser 100 is shown, according to an example embodiment. The dispenser 100 may be used to store and/or display consumer goods in a convenience store. The dispenser 100 is able to display and dispense items that vary in size, such as items varying from packs of gum to cereal boxes. Typically, a plurality of dispensers 100 are lined up on a shelf in close in close proximity to each other, displaying the consumer goods and making the consumer goods easy to access.

The dispenser 100 may be removably coupled to a surface 104. The surface 104 may be a shelf on a shelving unit, a countertop, a table, or any similar surface. The dispenser 100 may be coupled to the surface 104 to prevent the dispenser 100 from moving while the dispenser 100 is in use.

The dispenser includes a body 108, a container unit 120, a first ledge 130, a second ledge 140, a stopper 150, a track 170, and a biasing member 180. The body 108 is configured to accept consumer goods and hold them in an orientation determined by a convenience store owner or employee. In various embodiments, the body 108 may be a part, a shell, or a piece. In some embodiments, the body 108 interfaces with the surface 104. In some embodiments, the body 108 is manufactured from clear plastic to improve the visibility of the consumer goods. In other embodiments, the body 108 is manufactured from wood, metal, glass, or any other material. In some embodiments, the body 108 is decorated to make the dispenser 100 visually appealing to the consumer.

The body 108 of the dispenser 100 includes a first ledge 130 and a second ledge 140. The second ledge 140 is spaced laterally away from the first ledge 130, such that the first ledge 130 and the second ledge 140 are substantially parallel to each other. The first ledge 130 is disposed on a first end 110 of the body 108 and defines the first end 110 of the body 108. The second ledge 140 defines a second end 112 of the body 108 and is opposite the first end 110 and opposite the first ledge 130. The body 108 extends between the first ledge 130 and the second ledge 140. The first ledge 130 and the second ledge 140 are positioned such that at least one container unit 120 can fit between the first ledge 130 and the second ledge 140.

The stopper 150 is slidably coupled to the body 108. The stopper 150 is configured to slide relative to the body 108 between the first ledge 130 and the second ledge 140 along the track 170. The stopper 150 is structured to secure a container unit 120 within the body 108 of the dispenser 100.

The stopper 150 includes a first face 160 and a second face 165. The first face 160 interfaces with the container unit 120, securing the container unit 120 in the body 108 of the dispenser 100. The first face 160 is structurally integrated with the stopper 150. In some embodiments, the first face 160 is coupled to the stopper 150. The second face 165 is positioned opposite to the first face 160 and is structurally integrated with the stopper 150. The second face 165 may not interface with the container unit 120. In some embodiments, the second face 165 interfaces with the container unit 120. When a container unit 120 in placed in the dispenser 100, it is understood that the container unit 120 is placed between the second ledge 140 and the first face 160 such that the first face 160 interfaces with the container unit 120.

The track 170 is positioned between the first ledge 130 and the second ledge 140, extending the length of the body 108. The track 170 may be structurally integrated with the body 108. In some embodiments, the track 170 is manufactured separate from the body 108 and later coupled to the body 108. The track 170 is configured to accept at least a portion of the stopper 150 and to facilitate the translational sliding of the stopper 150 between the first ledge 130 and the second ledge 140.

The biasing member 180 may be coupled to the second ledge 140 and stopper 150 such that the stopper 150 is biased toward the second ledge 140 by a force applied by the biasing member 180. While the biasing member 180 biases the stopper 150 toward the second ledge 140, the biasing member 180 allows for translational movement of the stopper 150 toward the first ledge 130. In some embodiments, the biasing member is a constant force spring. In other embodiments, the stopper 150 is biased toward the second ledge 140 by a force applied by gravity. In some embodiments, the biasing member is a threaded rod, screw, motorized member, mechanical coil, or similar movement inducing members.

Figure 3:
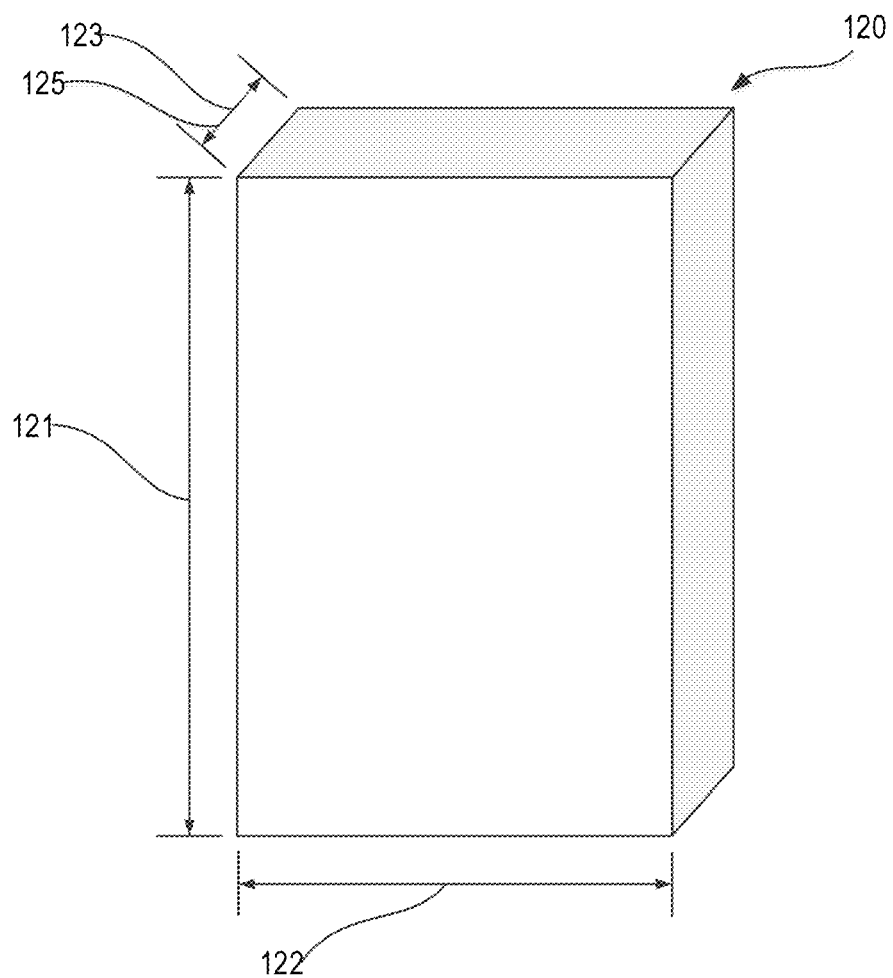
FIG. 3 shows a perspective view of a container unit.

Referring to FIG. 3, a perspective view of the container unit 120 is shown. The container unit 120 has a height 121, a width 122, and a depth 123. To properly count the container unit 120, a single container unit distance 125 is defined. The single container unit distance 125 is equal to at least one of the height 121, the width 122, or the depth 123. In the case of the container unit 120, the single container unit distance 125 is equal to the depth 123.

A container unit 120 is configured to be placed into the body 108 along the track 170. The container unit 120 may be a container unit 120 as shown in FIG. 3, and discussed in greater detail below. The container unit 120 is configured to interface with the body 108 such that the container unit 120 may be removed from the body 108 by a consumer or employee and/or replaced in the body 108 by a consumer or employee. In some embodiments, the container unit 120 is substantially box-like. In other embodiments, the container unit 120 has a non-conventional geometry, such as a star or a pyramid. In those embodiments, the dispenser 100 is modified to accommodate the non-conventional geometry.

As will be appreciated, when the container unit 120 is placed between the second ledge 140 and the first face 160 of the stopper 150 the stopper 150 is biased (e.g., forced, moved, pushed, translated, etc.) a distance equal to the single container unit distance 125 toward the first ledge 130 by the force applied by the biasing member 180. The force applied by the biasing member 180 on the stopper 150 causes the first face 160 to interface with the container unit 120 such that the container unit 120 is securely held in place between the stopper 150 and the second ledge 140. As more container units 120 are added between the second ledge 140 and the stopper 150 by an installation force (applied by a person inserting the container unit 120), the stopper 150 moves toward the first ledge 130. This movement of the stopper 150 causes the biasing member 180 (e.g., coil spring) to unravel and acquire elastic potential energy. When the container unit 120 is removed from the dispenser 100, the biasing member 180 biases the stopper 150 toward the second ledge 140 the distance equal to the single container unit distance 125. As the stopper 150 moves toward the second ledge 140, the biasing member 180 coils up, releasing elastic potential energy.

Figure 4:
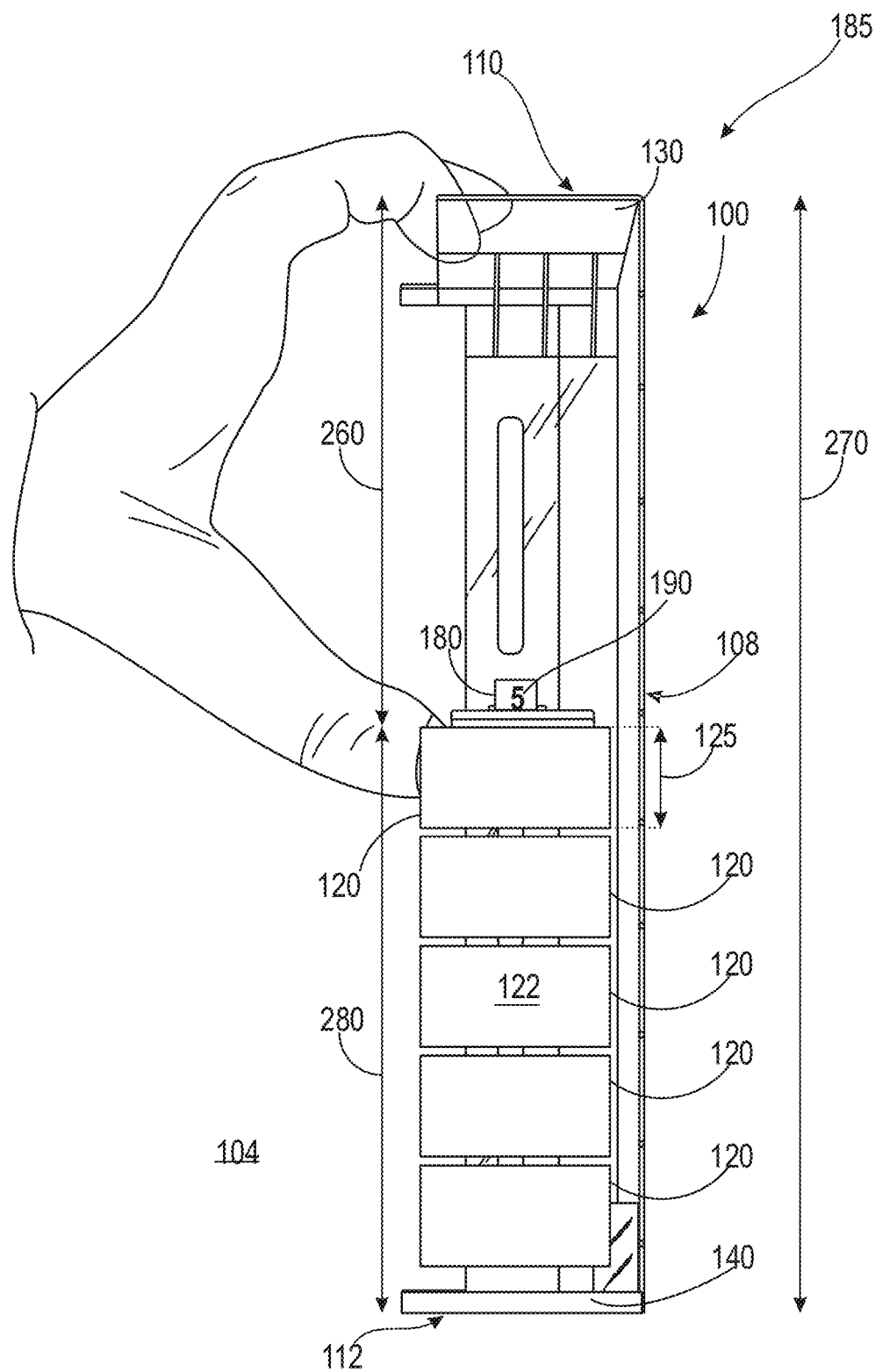
FIG. 4 shows a top view of an autonomous inventory counting and tracking system, according to an exemplary embodiment.

Referring to FIG. 4, an AICT system 185 is shown, according to a first exemplary embodiment. The AICT system 185 includes the dispenser 100 and an identifier 190. The identifier 190 may be a shape, QR code, barcode, color, reflector, dot matrix, image, color, code, number, numeral, or other representation of the number of container units 200 in a dispenser 100.

The identifier 190 is displayed (e.g., shown, seen, etc.) on the biasing member 180. The identifier 190 may change in response to the removal of the container unit 120 from the dispenser 100 of the AICT system 185 or the addition of the container unit 120 to the dispenser 100 of the AICT system 185. The identifier 190 may be coupled (e.g., attached) to the biasing member 180 using glue, fasteners, welding connections, or any other coupling method. In some embodiments, the identifier 190 is formed as a single piece with the biasing member 180 through a process such as engraving, embossing, stamping, or any similar process. In other embodiments, the identifier 190 is drawn on (e.g., written on, sketched on, etc.) using a marker, paint, pencil, pen, or any other marking tool.

The AICT system 185 includes a plurality of container units 200. The plurality of container units 200 are stocked (e.g., disposed, placed, located, etc.) in the body 108. Each of the plurality of container units 200 is substantially the same geometric size and shape. More specifically, each of the plurality of container units 200 is defined by the single container unit distance 125. The AICT system 185 relies on the consistency of the single container unit distance 125 to measure the inventory count. The plurality of container units 200 are positioned in the body 108 such that the single container unit distance 125 of each of the plurality of container units 200 runs substantially parallel to the track 170. Consistent placement and orientation of the plurality of container units 200 within the AICT system 185 allows the AICT system 185 to autonomously measure the inventory count both reliably and repeatedly.

As shown in FIG. 4, the stopper 150 is displaced from the second ledge 140 a distance equal to approximately five times the single container unit distance 125. The biasing member 180 applies a force to the stopper 150 in a direction toward the second ledge 140. The first face 160, biased by the force applied by the biasing member 180, interfaces with at least one of the plurality of container units 200 such that the plurality of container units 200 are securely held in the body 108. The biasing member 180 displays the identifier 190 to a person taking inventory (or in other embodiments, a camera, reflective surface, etc.), the identifier corresponding to the inventory count. As shown in FIG. 4, the identifier 190 displays the number "5".

Figure 5B:
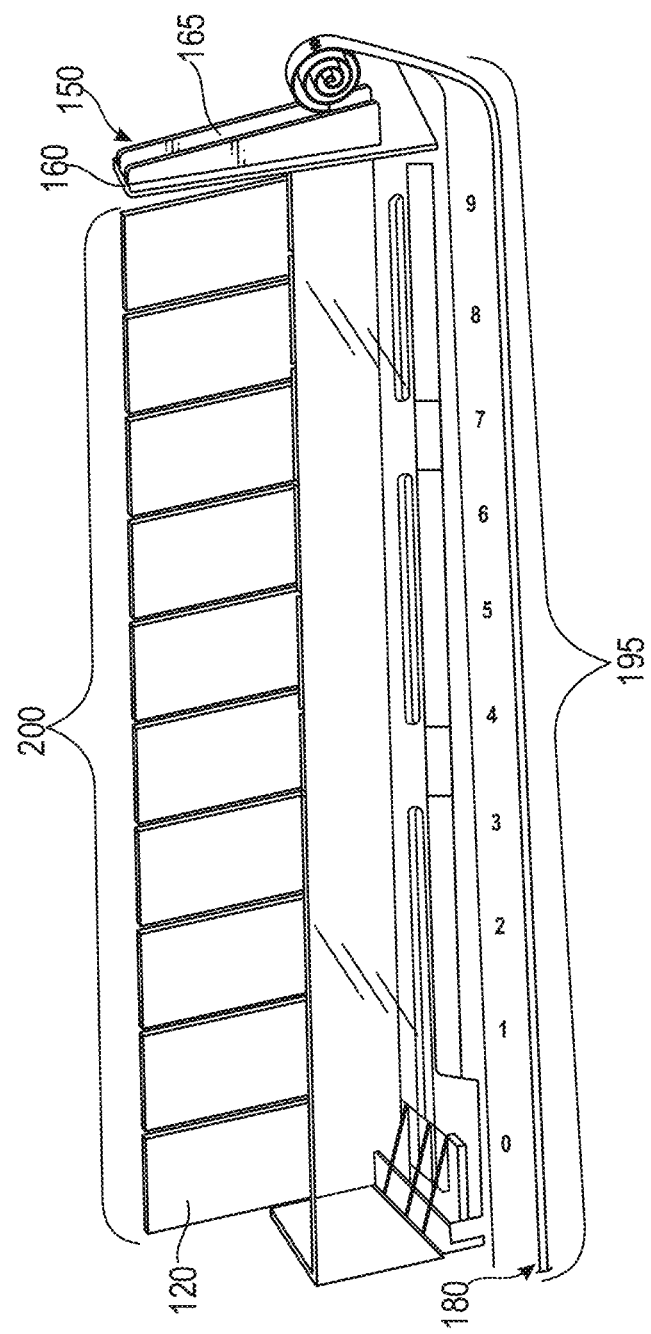
FIG. 5B shows a side view of a portion of the autonomous inventory counting and tracking system of FIG. 4.

Referring to FIGS. 5A and 5B, the loading/unloading of a container unit 120 into the AICT system 185 is shown. When the container unit 120 is removed from the AICT system 185, the stopper 150 is biased by the biasing member 180, the stopper 150 moving toward the second ledge 140. As a result of the movement of the stopper 150, the biasing member 180 rolls up, hiding at least a portion of the biasing member 180 that had been exposed before the movement of the stopper 150. The identifier 190 is exposed and visible to a person taking inventory (or in other embodiments, a camera, reflective surface, etc.). As shown in FIG. 5A, the AICT system 185 at the first position 502 has the identifier 190 exposed and displays the number "2". When the container unit 120 is added to the AICT system 185 the AICT system 185 transitions to the second position 504. In the second position 504, the stopper 150 is biased by the container unit 120 toward the first ledge 130 (not shown). As a result of the movement of the stopper 150, the biasing member 180 unwinds (e.g., rotates), exposing at least a portion of the biasing member 180 that had been hidden before the movement of the stopper 150. The identifier 190 is exposed and visible to a person taking inventory. In the second position 504, the identifier 190 is exposed and displays the number "3". If the single container unit distance 125 of the container unit 120 is known, then the biasing member 180 may be labeled with the identifier 190 such the identifier 190 corresponds to the inventory count. In some cases, a configuration of the biasing member 180 will be necessary before the AICT system 185 can be used for taking inventory.

Referring to FIG. 5B a bottom view of the dispenser 100 is shown. The dispenser 100 contains the plurality of container units 200 and the biasing member 180 contains a plurality of identifiers 195. In some embodiments, the identifiers 195 are engraved or embossed directly on the biasing member 180 rather than inside. Each of the plurality of identifiers 195 correspond to the inventory count. The biasing member 180 is configured to make no more than one of the plurality of identifiers 195 visible at any given time. Each one of the plurality of identifiers 195 corresponds to one of the plurality of container units 200. If, for example, the dispenser 100 of the AICT system 185 holds ten of the plurality of container units 200 when at capacity, the biasing member 180 will have ten of the plurality of identifiers 195.

As will be appreciated, when the first face 160 of the AICT system 185 is displaced from the second ledge 140 a distance equal to three times the single container unit distance 125, the identifier 190 displays the number "3". By displaying the identifier 190 corresponding to the inventory count, a person taking inventory can quickly and accurately record the inventory count without having to individually count each of the plurality of container units 200 disposed within the AICT system 185. Similarly, when the first face 160 of the AICT system 185 is a distance equal to the single container unit distance 125 from the second ledge 140, the identifier 190 displays the number "1". By displaying the identifier 190 corresponding to the inventory count, a person taking inventory can quickly and accurately record the inventory count without having to count each of the plurality of container units 200 disposed within the AICT system 185.

Figure 6:
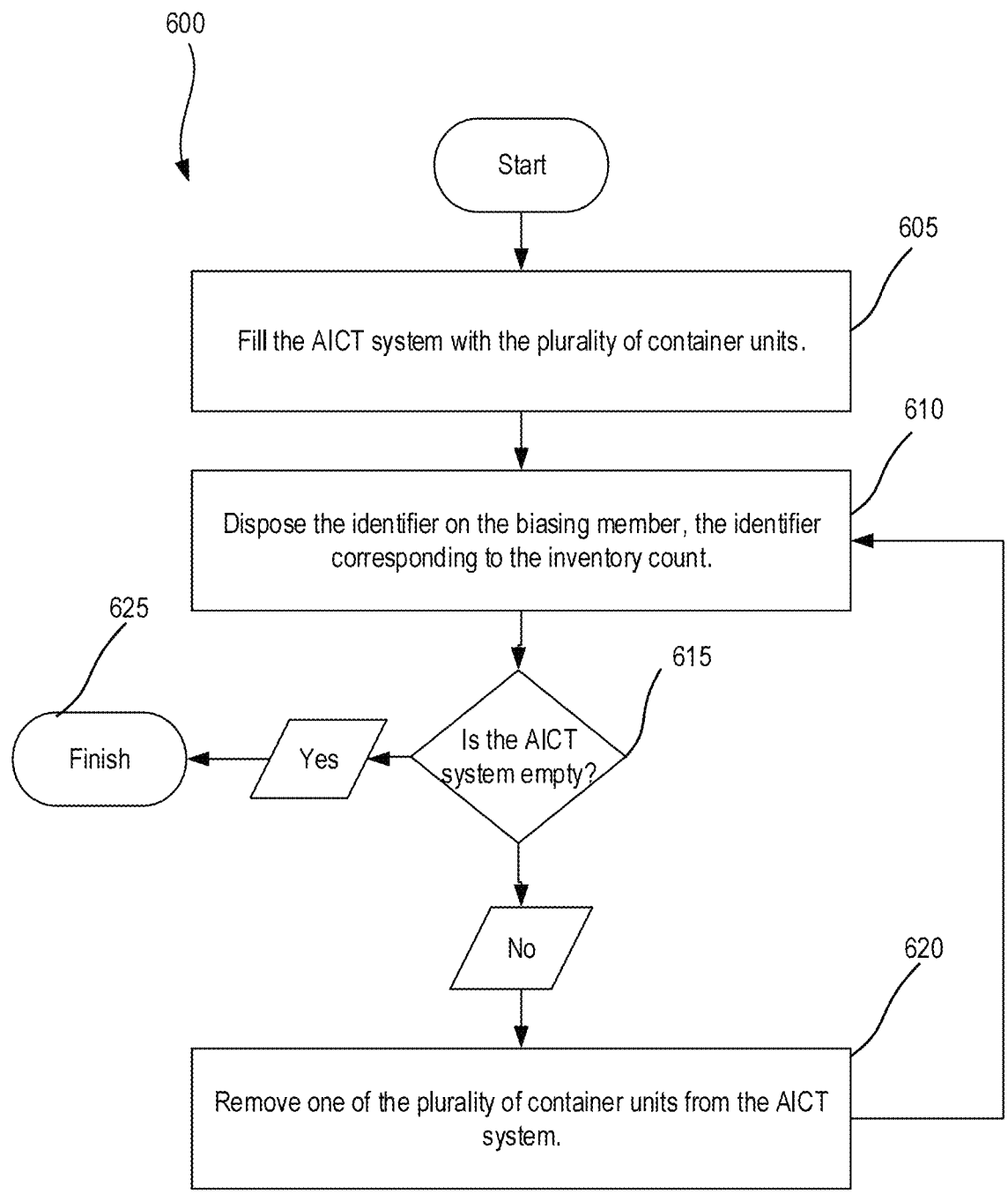
FIG. 6 shows a method of configuring the autonomous inventory counting and tracking system of FIG. 4.

Referring to FIG. 6, a method 600 of configuring the AICT system 185 is shown, according to an exemplary embodiment. At (605), the dispenser 100 of the AICT system 185 is filled with the plurality of container units 200 until the dispenser 100 of the AICT system 185 is at capacity. The plurality of container units 200 may be similarly oriented within the dispenser 100 such that the dimension corresponding to the single container unit distance 125 is substantially parallel to the track 170.

At (610), the identifier 190 is disposed on the biasing member 180 such that the identifier 190 is visible to a person taking inventory. The identifier 190 may be at least one of drawn on, coupled to, or structurally integrated with the biasing member 180. The identifier 190 disposed on the biasing member 180 corresponds to the inventory count.

At (615), the AICT system 185 is checked. If the AICT system 185 is empty, meaning that none of the plurality of container units 200 is disposed within the dispenser 100 of the AICT system 185, then the configuration is complete. If there is at least one of the plurality of container units 200 disposed within the AICT system 185, then the method of configuration continues to (620).

At (620), one of the plurality of container units 200 is removed from the AICT system 185, and (610) is repeated until the AICT system 185 is empty at (625), To configure the AICT system 185 such that the identifier 190 corresponds to the inventory count, the plurality of container units 200 is disposed within the AICT system 185 while the identifier 190 is added to the biasing member 180. If three of the plurality of container units 200 are disposed within the AICT system 185, then, in some embodiments, the identifier 190 displaying the number "3" may be added to the biasing member 180 such that it is visible to a person taking inventory. Once the identifier 190 displaying '3' is added to the biasing member 180, then one of the plurality of container units 200 still remaining in the AICT system 185 is removed such that only two of the plurality of container units 200 still remain within the AICT system 185. If two of the plurality of container units 200 are disposed within the AICT system 185, then, in some embodiments, the identifier 190 displaying the number "2" may be added to the biasing member 180. This process is repeated until zero of the plurality of container units 200 remain within the AICT system 185.

In some embodiments, the identifier 190 disposed on the biasing member 180 may not be easily visible to a person taking inventory of consumer goods. In such circumstances, it may be necessary for the employee to relocate the AICT system 185 relative to the surface 104 to see the identifier 190 on the biasing member 180. This can cause taking inventory to be time consuming and possibly dangerous should the consumer goods disposed within the AICT system 185 be exceptionally heavy or containing hazardous materials.

Figure 7:
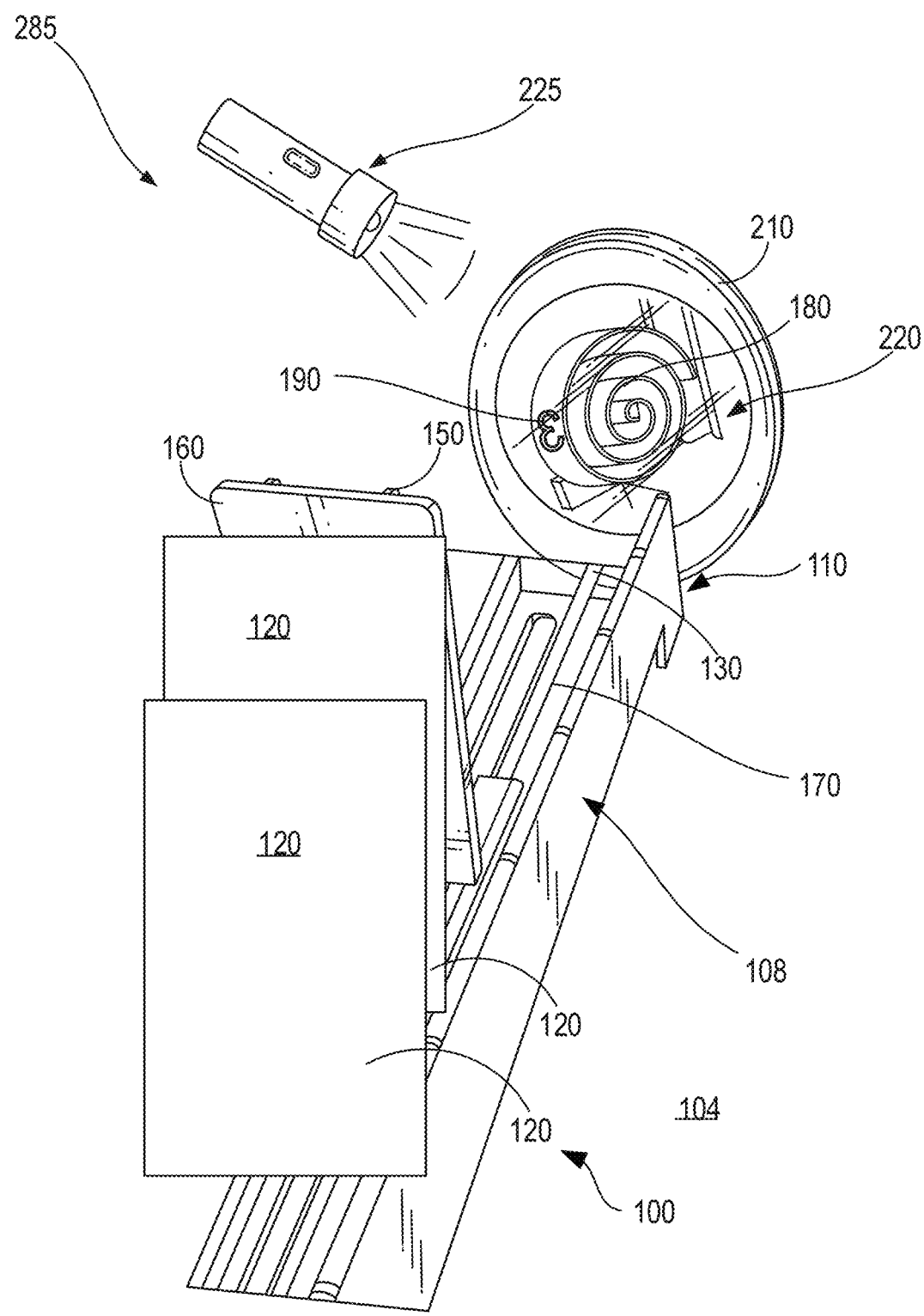
FIG. 7 shows a perspective view of an autonomous inventory counting and tracking system, according to another exemplary embodiment.

Referring to FIG. 7, an AICT system 285 is shown, according to another exemplary embodiment. The AICT system 285 is similar to the AICT system 185. A difference between the AICT system 285 and the AICT system 185 is the AICT system 285 includes a reflective surface (e.g., a mirror, polished chrome, etc.) 210. Accordingly, similar features between the AICT system 185 and the AICT system 285 have similar numbering. The reflective surface 210 allows a user to see a reflection 220 of the identifier 190. This allows a person taking inventory to see the identifier 190 without having to relocate the AICT system 285 relative to the surface 104. The reflective surface 210 may be coupled to a wall, a shelf, or the dispenser 100. Further, lighting elements 225 may be added to the surrounding environment to improve visibility of the identifier 190.

Figure 8:
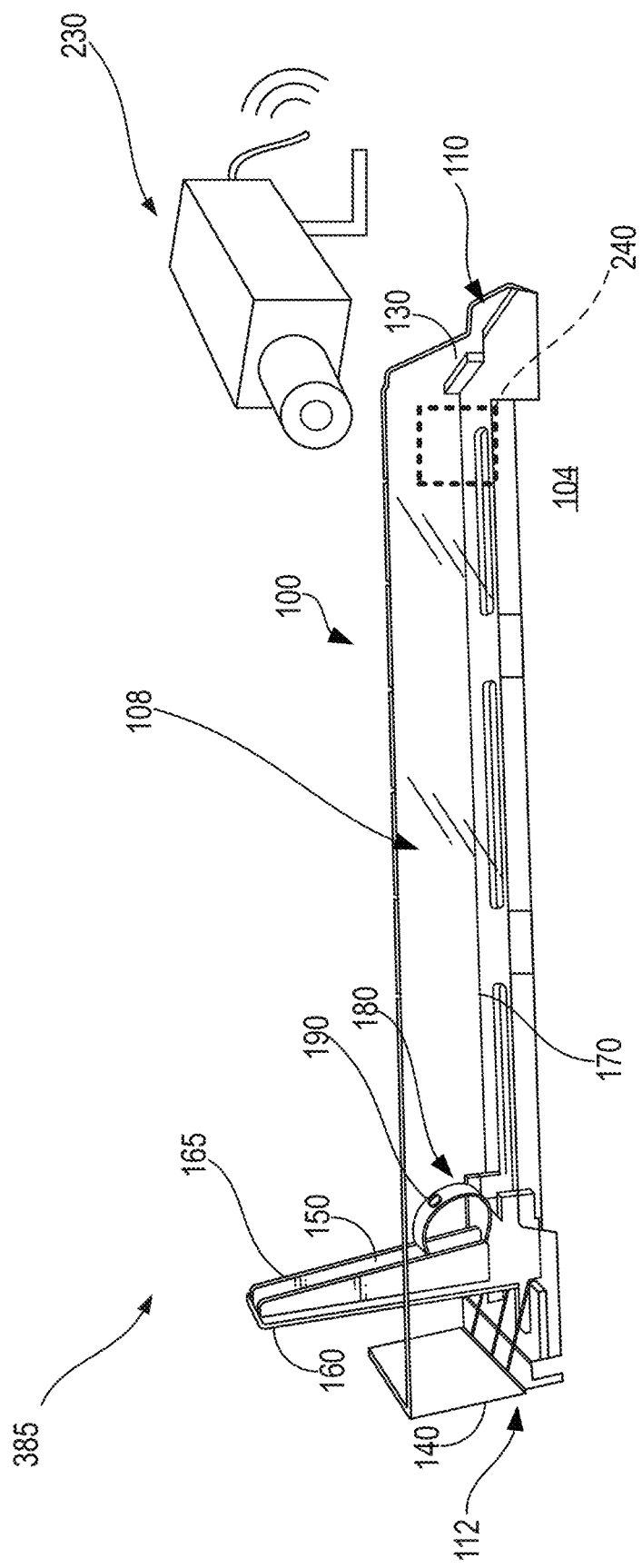
FIG. 8 shows a perspective view of an autonomous inventory counting and tracking system, according to yet another exemplary embodiment.

Referring to FIG. 8, an AICT system 385 is shown, according to another exemplary embodiment. The AICT system 385 is similar to the AICT system 185. A difference between the AICT system 385 and the AICT system 185 is the AICT system 385 includes a camera 230 (e.g., sensor). Accordingly, similar features between the AICT system 185 and the AICT system 385 have similar numbering. In some embodiments, the camera 230 may be implemented with a microprocessor 240, a computing system, and/or a microcontroller. The camera 230 may be coupled to the first end 110 of the dispenser 100. In other embodiments, the camera 230 is coupled to a wall or a shelf. The camera 230 is configured to record (e.g., face, see, capture, look at, etc.) the identifier 190 displayed on the biasing member 180. Implementing the camera 230 is especially advantageous when both the identifier 190 and the reflective surface 210 are hidden from the view of a person taking inventory. The microprocessor 240 is configured to control the camera 230, the microprocessor 240 further configured to convert the identifier 190 recorded by the camera 230 to a digital signal. The digital signal may be stored in a memory as inventory data. In some embodiments, the digital signal may be uploaded to an online database to allow for active inventory tracking and data storage. Tracking inventory using the camera 230 and the microprocessor 240 allows a convenience store owner to actively track inventory in real-time instead of tracking inventory by reviewing hand-written inventory records. Beneficially, the camera 230 may be configured to view multiple rows (e.g., multiple tracks 170 each with their own stopper 150 and container units 120 disposed between the stopper 150 and second ledge 140).

Figure 9:
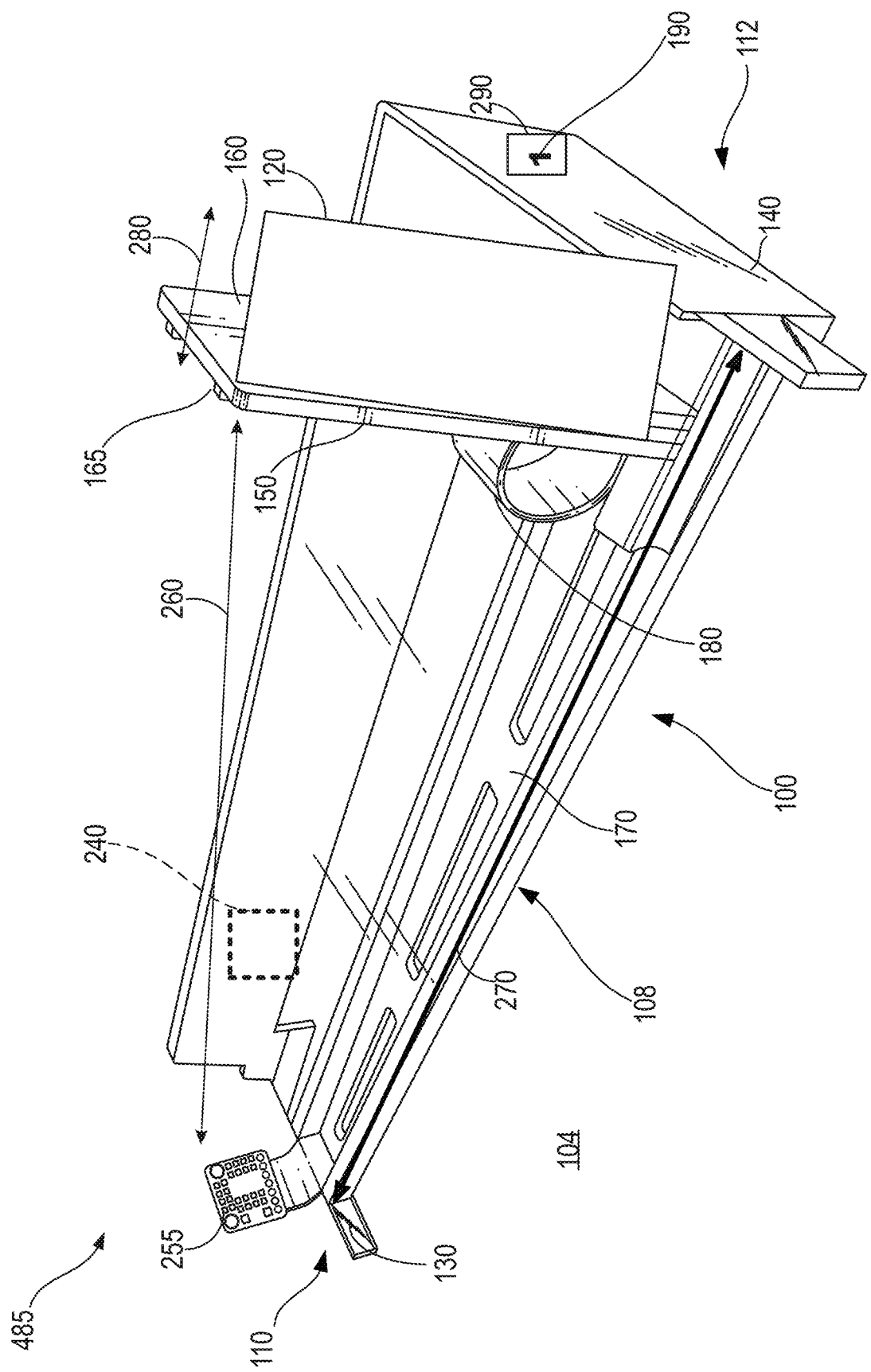
FIG. 9 shows a perspective view of an autonomous inventory counting and tracking system, according to an even further exemplary embodiment.

Turning to FIG. 9, an AICT system 485 is shown, according to another exemplary embodiment. The AICT system 485 is similar to the AICT system 185. A difference between the AICT system 485 and the AICT system 185 is the AICT system 485 includes a distance sensor 255. Accordingly, similar features between the AICT system 185 and the AICT system 485 have similar numbering. The distance sensor 255 is coupled to the second face 165 the stopper 150. The distance sensor 255 measures a container unit distance 260. The available container unit distance 260 is defined as the distance between the second face 165 and the first ledge 130. In some embodiments, the AICT system 485 includes the distance sensor 255 coupled to the first ledge 130, the distance sensor 255 measuring the available container unit distance 260.

The AICT system 485 also includes the microprocessor 240. In some embodiments, the microprocessor 240 is configured to control the distance sensor 255. In some embodiments, the microprocessor 240 is further configured to communicate with the distance sensor 255 through a wireless communication method. In some embodiments, the microprocessor 240 communicates with the distance sensor 255 through a wired connection. In other embodiments, the distance sensor 255 is integrated with the microprocessor 240.

Stored within a memory of the microprocessor 240 is a maximum container unit distance 270. The maximum container unit distance 270 is defined as the distance between the first face 160 and second ledge 140 when the AICT system 485 is at full capacity (e.g., completely filled with the plurality of container units 200). The maximum container unit distance 270 is either pre-determined or determined during a configuration of the AICT system 485. The maximum container unit distance 270 may be configured before the AICT system 485 takes inventory reliably and repeatedly. The maximum container unit distance 270 may be re-configured each time the AICT system 485 is used to stock (e.g., hold, display, accept, store, etc.) a different consumer product (e.g., a consumer product that varies in size when compared to the consumer product used for a previous configuration). However, reconfiguration would not be necessary if the AICT system 485 is being restocked (e.g., refilled, resupplied, etc.) with the same product used for the previous configuration.

The microprocessor 240 is further configured to determine a total container unit distance 280. The total container unit distance 280 is defined as the absolute value of the difference between the maximum container unit distance 270 and the available container unit distance 260. In some embodiments, the total container unit distance 280 is directly measured by the distance sensor 255, the distance sensor 255 measuring the distance between the second ledge 140 and the first face 160.

The microprocessor 240 is configured to determine the inventory count using the single container unit distance 125 and the total container unit distance 280, the microprocessor 240 dividing the total container unit distance 280 by the single container unit distance 125. The microprocessor 240 transmits the inventory count to a display 290. The display 290 is coupled to the second ledge 140 such that it is visible to a person taking inventory. In some embodiments, the display 290 is separate from the AICT system 485, such as, for example, a computer monitor in an office. In other embodiments, the display 290 is an electronic display screen (e.g., mobile computing device screen, computing device screen, etc.). The display 290 displays the identifier 190 corresponding to the inventory count. In some embodiments, the microprocessor 240 may save the inventory data to the memory to be recalled at a later time. In other embodiments, the microprocessor 240 may upload the inventory count to an online database, allowing the inventory count to be actively tracked from a remote location.

Figure 10:
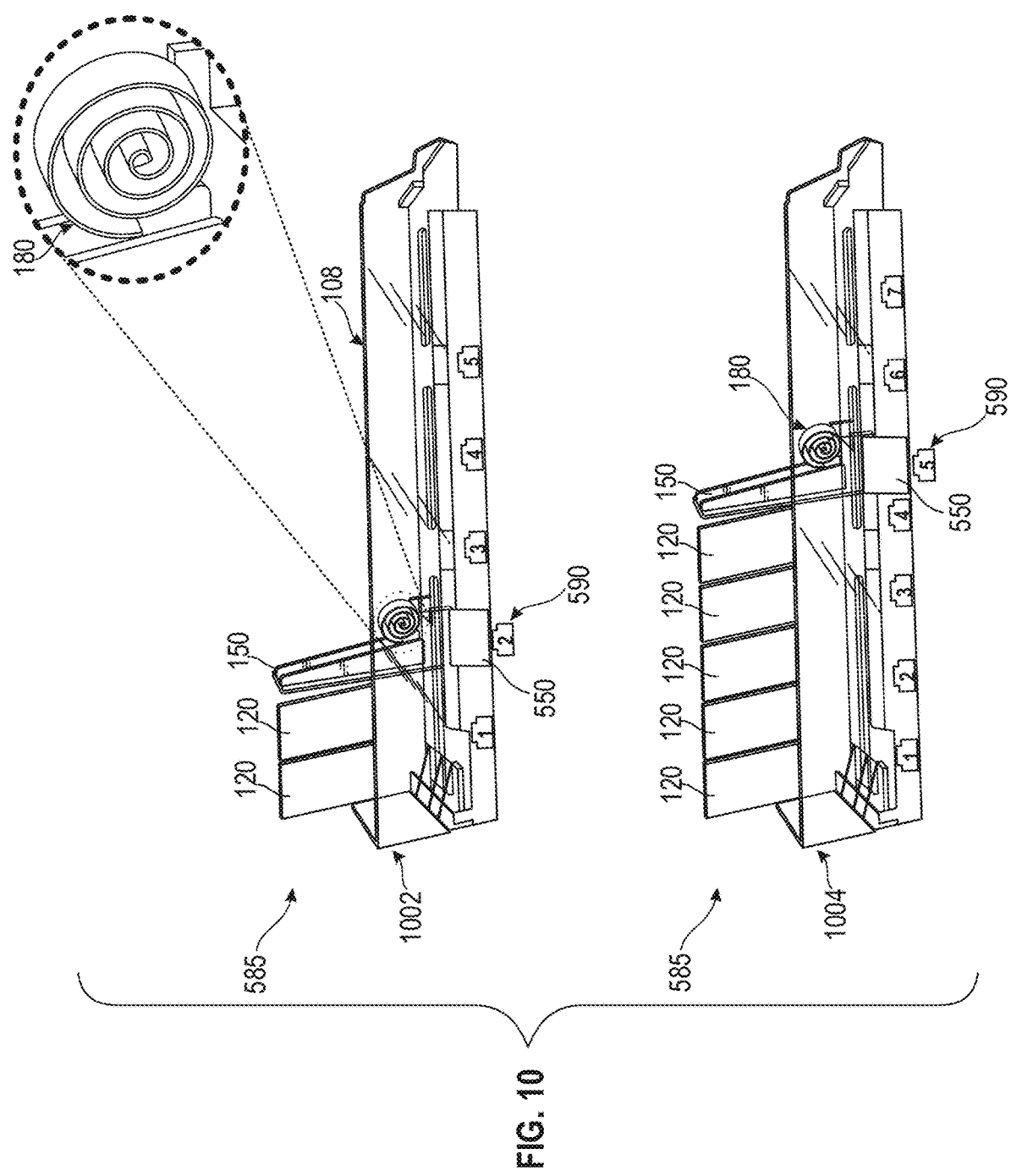
FIG. 10 shows a pair of perspective view of an autonomous inventory counting and tracking system in different positions, according to an even further exemplary embodiment.

Turning to FIG. 10, an AICT system 585 is shown, according to another exemplary embodiment. The AICT system 585 is similar to the AICT system 185. A difference between the AICT system 585 and the AICT system 185 is the AICT system 585 includes a plunger 550 that is configured to engage (e.g., pop-out) plurality of tabs as the identifier 590. In some embodiments, a distance sensor 255 may be implemented such that the distance sensor 255 is coupled to the second face 165 the stopper 150. Accordingly, similar features between the AICT system 185 and the AICT system 585 have similar numbering.

The plunger 550 is coupled to the stopper 150 and is configured to engage the identifier tabs 590 that are disposed along the track 170. The identifier tabs 590 are numbered to indicate the number of container units 120 remaining along the track 170. As container units 120 are added or removed, causing the stopper 150 to move along the track 170, the plunger 550 comes into contact and pushes out the identifier tabs 590. The identifier tabs 590 are structured to be viewable by a user as they are engaged by the plunger. As shown in FIG. 10, when the AICT system 585 is at a first position 1002, the plunger 550 engages an identifier tab 590 with the number "3" and the identifier tab 590 is viewable. As two more container units 120 are added along the track 170, the AICT system 585 moves to a second position 1004 causing the plunger 550 to engage an identifier tab 590 with the number "5" such that the identifier tab 590 is viewable by a user. In some embodiments, the identifier tabs 590 are disposed on a top portion/structure of the AICT system 585 and are configured to pop-up when the plunger 550 contacts the identifier tab 590.

Figure 11:
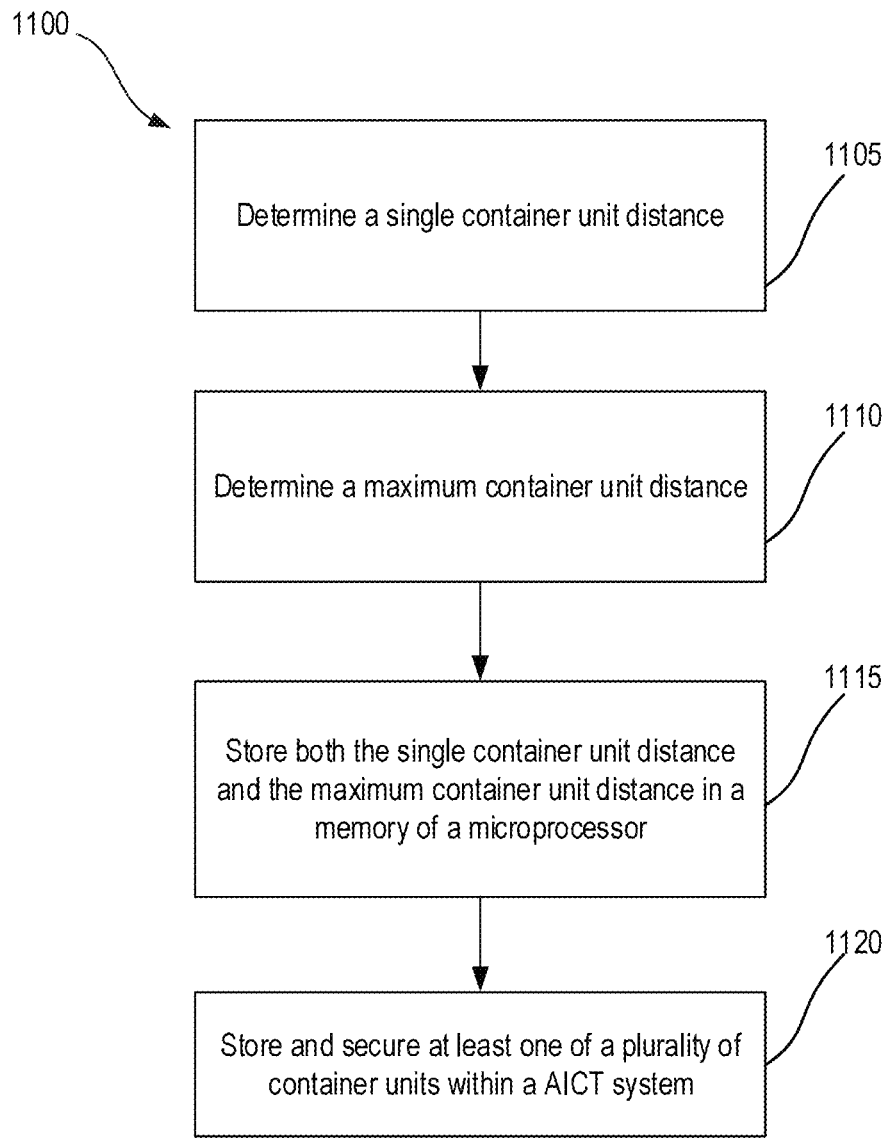
FIG. 11 shows a method for configuring the autonomous inventory counting and tracking system, according to an exemplary embodiment.

Referring to FIG. 11, a method 1100 of configuring an AICT system is shown, according to an exemplary embodiment. The AICT system may be any one of the AICT systems 185, 285, 384, 485, 585 of FIGS. 1-10. At (1105), the single container unit distance 125 is determined. The single container unit distance 125 may be determined by a person using a measuring instrument, such as calipers, or the single container unit distance 125 may be determined by the manufacturer of the container unit 120.

At (1110), the maximum container unit distance 270 is determined. The maximum container unit distance 270 may be determined by a person using a measuring instrument, such as calipers. In some embodiments, the maximum container unit distance 270 is determined by the distance sensor 255 and the microprocessor 240 of the AICT system 185.

At (1115), both the single container unit distance 125 and the maximum container unit distance 270 are stored on the memory of the microprocessor 240 to be recalled at a later time, as shown at (1215) of FIG. 12, described below. In some embodiments, it is necessary to manually program the single container unit distance 125 and the maximum container unit distance 270 into the memory of the microprocessor 240.

At (1120), the plurality of container units 200 is stored within the dispenser 100 of the AICT system 185. The plurality of container units 200 are secured within the dispenser 100 of the AICT system 185 by the stopper 150. The stopper 150 may be biased by the biasing member 180 such that the first face 160 interfaces with at least one of the plurality of container units 200.

The maximum container unit distance 270 may be easier to measure when the dispenser 100 of the AICT system 185 is filled to capacity with the plurality of container units 200. Once one of the plurality of container units 200 has been removed from the dispenser 100 of the AICT system 185, the maximum container unit distance 270 may only be determined through extrapolation of the total container unit distance 280 and the single container unit distance 125, which may be inaccurate when compared to the maximum container unit distance 270 directly measured during (1110).

The microprocessor 240 will later recall the single container unit distance 125 and the maximum container unit distance 270 from the memory after controlling the distance sensor 255 to measure the available container unit distance 260.

Figure 12:
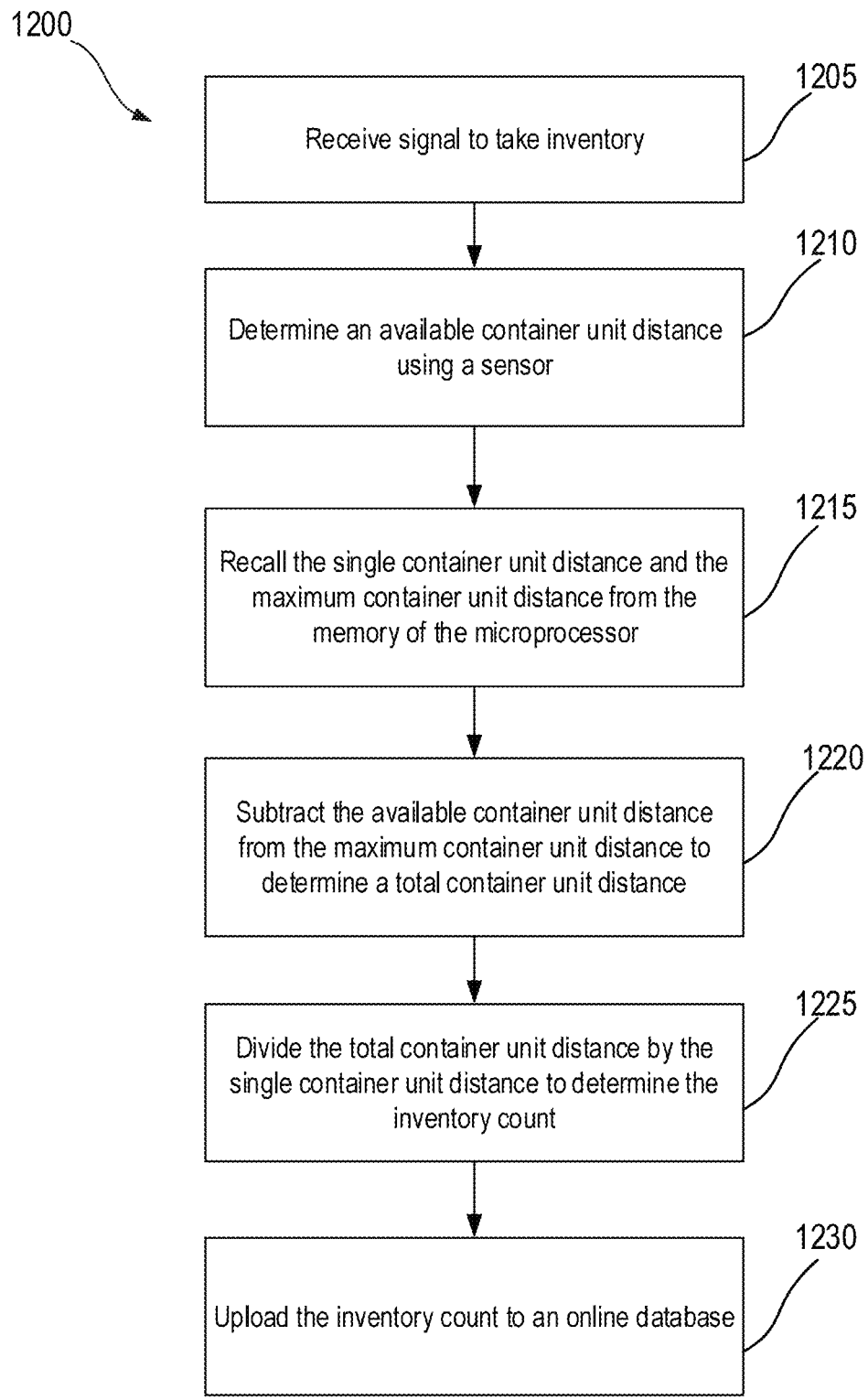
FIG. 12 shows a method for autonomously counting and tracking inventory using the autonomous inventory counting and tracking system, according to an exemplary embodiment.

Referring to FIG. 12, a method 1200 of autonomously taking inventory with an AICT system is shown, according to an exemplary embodiment. The AICT system may be any one of the AICT systems 185, 285, 384, 485, 585 of FIGS. 1-10. At (1205), the microprocessor 240 receives a signal to take inventory. In some embodiments, the signal may originate from a person taking inventory in the form of a voice command or a button press. In other embodiments, the signal is generated by a computer. In other embodiments, the computer generates a signal according to a schedule used for facilitating times for the collection of inventory data.

At (1210), the microprocessor 240 controls the distance sensor 255 to determine the available container unit distance 260. In other embodiments, the microprocessor 240 controls the distance sensor 255 to determine the total container unit distance 280.

At (1215), the microprocessor 240 recalls the single container unit distance 125 and the maximum container unit distance 270 from the memory. In some embodiments, the single container unit distance 125 is determined at (1105) of method 1100 of FIG. 11, described above. In other embodiments, the maximum container unit distance 270 is determined at (1110) of method 1100 of FIG. 11, described above.

At (1220), the microprocessor 240 subtracts the available container unit distance 260 from the maximum container unit distance 270 to determine the total container unit distance 280. In some embodiments, the total container unit distance 280 is stored in the memory. In other embodiments, the total container unit distance 280 is measured using the distance sensor 255. In some embodiments, the distance sensor 255 is coupled to an arm or similar feature of the AICT system and is configured to move along with the movement of the arm.

At (1225), the microprocessor 240 divides the total container unit distance 280 by the single container unit distance 125 to determine the inventory count. In some embodiments, the microprocessor 240 rounds the quotient of the total container unit distance 280 and the single container unit distance 125 to the nearest integer, storing the result in the memory as the inventory count.

At (1230), the microprocessor 240 uploads the inventory count to an online database that may be accessed by a computer. In some embodiments, the microprocessor 240 controls the display 290 to display the inventory count such that the inventory count is visible to a person taking inventory.

The microprocessor 240 controls the distance sensor 255 to measure the available container unit distance 260, which is, in simple terms, the empty space in the dispenser 100 of the AICT system 185. The microprocessor 240 determines how much space within the dispenser 100 is filled with the plurality of container units 200 (shown as the total container unit distance 280) by subtracting the available container unit distance 260, measured by the distance sensor 255, from the maximum container unit distance 270, recalled from memory. After solving for the total container unit distance 280, the microprocessor 240 divides the total container unit distance 280 by the single container unit distance 125, the single container unit distance 125 recalled from memory; the result is the inventory count. The inventory count may then be uploaded to an online database and/or displayed on the display 290.

While the AICT systems 185, 285, 384, 485, 585 of FIGS. 1-10 are described with respect to a container unit/track system, it will be appreciated that any one of the AICT systems 185, 285, 384, 485, 585 could be implemented with a vending machine. Currently, most vending machines have the container/consumer products stacked or placed behind each other. The AICT system could be implemented within the vending machine such that the distance sensor, camera, or other visual hardware, with a microprocessor can track the purchase of items in the vending machine. Typically, vending machines utilize a coil mechanism that move as vending items are selected and dispensed. The AICT system may be implemented such that each cavity in the coil mechanism is used to identify an amount of vending units left in a row of a vending machine. In some embodiments, the AICT system is configured to track purchasing of individual items (e.g., popularity) and/or to facilitate re-stock of low inventoried items. As will be readily apparent, other vending machine configuration could have the AICT system implemented within the dispensing mechanism to track inventory.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. For example, the term "substantially" refers to within 5% of the recited feature. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single container unitary body with one another, with the two components, or with the two components and any additional intermediate components being attached to one another. Examples of connections or configurations for connecting may include piping, channels, or any other suitable components for enabling the flow of a fluid from one component or object to another.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing container unit, a system memory, and a system bus that couples various system components including the system memory to the processing container unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed:

1. A method of tracking inventory comprising:
   providing a dispenser comprising:
      a body laterally extending between a first end and a second end;
      a stopper slidably coupled to the body to move between the first end and the second end;
      a biasing member coupled to the stopper to bias the stopper towards the second end, wherein a plurality of identifiers are displayed on the biasing member;
   securing a plurality of units within the dispenser between the stopper and the second end;
   displaying at least one of the plurality of identifiers to a user of the dispenser, the at least one of the plurality of identifiers corresponding to a total number of units in the dispenser; and
   displaying, on a reflecting surface, a reflection of the at least one of the plurality of identifiers, wherein the reflecting surface is fixed to the first end of the body of the dispenser,
   wherein the stopper moves relative to the reflecting surface.

2. The method of claim 1, wherein the biasing member includes a substantially constant force spring.

3. The method of claim 1, further comprising:
   sensing, by a distance sensor, a distance between the stopper and the first end; and
   determining, by a controller operably coupled to the distance sensor, a total number of units based on the distance and a width of a unit.

4. The method of claim 3, further comprising uploading, via the controller, the total number of units to an online database, the online database accessible from a remote location.

5. The method of claim 3, further comprising:
   recording, via the controller, an inventory count over a period of time; and
   transmitting, via the controller, a notification to a user device, the notification comprising the total number of units.

6. The method of claim 1, further comprising:
   measuring, with a sensor coupled to the body, a distance between the stopper and the first end;
   determining, with a controller operably coupled to the sensor, the total number of units based in part on the distance; and
   providing, via the controller, the total number of units to an online database.

7. The method of claim 1, further comprising:
   measuring, with a sensor coupled to the body, a distance between the stopper and the first end;
   providing a controller with a single container unit distance; and
   determining, with the controller, the total number of units based on the distance and the single container unit distance.

8. The method of claim 1, further comprising:
   determining a maximum unit distance representing the total number of units that the body can contain between the stopper and the second end; and
   determining a total unit distance representing a difference between the maximum unit distance and an available container unit distance, the available container unit distance a distance between the stopper and the first end; and
   determining, based on the total unit distance and a single container unit distance, the total number of units in the dispenser.

9. The method of claim 8, wherein the single container unit distance is defined by the distance that the stopper moves when a unit is added to the dispenser.

10. An autonomous inventory counting and tracking (AICT) system, the system comprising:
    a dispenser configured to accept a plurality of units, the dispenser comprising:
       a body laterally extending between a first end and a second end;
       a reflecting surface fixed to the first end;
       a stopper slidably coupled to the body to move between the first end and the second end; and
       a biasing member coupled to the stopper to bias the stopper towards at least one of the first end or the second end, wherein one or more identifiers are displayed on the biasing member and reflected on the reflecting surface, wherein a first identifier of the one or more identifiers is visible, the first identifier based on a position of the first identifier on the extendable biasing member relative to a distance between the stopper and the second end,
    wherein the stopper moves relative to the reflecting surface.

11. The AICT system of claim 10, the dispenser further comprising:
a distance sensor coupled to the body, the distance sensor configured to measure the distance between the stopper and the second end;
a controller configured to determine an inventory count using the distance and a single unit distance; and
a display configured to display the inventory count,
wherein the controller is configured to control the distance sensor and the display, and wherein the inventory count corresponds to a quantity of units in the dispenser.

12. The AICT system of claim 11, wherein the display is separate from the dispenser, and wherein the controller is configured to wirelessly communicate with the display.

13. The AICT system of claim 11, wherein the controller is communicably coupled to a remote database and configured to transmit the inventory count to the remote database.

14. The AICT system of claim 11, wherein the controller is configured to record the inventory count over a period of time and transmit a notification to a user device, the notification comprising the inventory count.

15. The AICT system of claim 10, wherein the biasing member is a rolled coil of metal, the rolled coil of metal comprising a first coil end coupled to the second end and a second coiled end coupled to the stopper.

16. The AICT system of claim 10, wherein the dispenser further comprises a track supported by the body, the track positioned between the first end and the second end and extending along the body.

17. The AICT system of claim 10, further comprising:
a plurality of units supported by the body, the plurality of units positioned between the stopper and the second end,
wherein a length of the biasing member depends on a quantity of the plurality of units, and
wherein the first identifier of the one or more identifiers is visible based on the length of the biasing member.

18. The AICT system of claim 10, further comprising:
a camera configured to capture an image including the first identifier visible on the biasing member; and
a controller operably coupled to the camera, the controller configured to upload identify the first identifier in the image and upload the first identifier to an online database.

19. The AICT system of claim 10, wherein the stopper is configured to move translationally toward the first end in response to a unit being added to the dispenser, and the stopper configured to move toward the second end in response to a unit being removed from the dispenser.

* * * * *